United States Patent [19]

Doniwa

[11] Patent Number: 5,105,519
[45] Date of Patent: Apr. 21, 1992

[54] TENSION CONTROL METHOD FOR NUTRUNNER

[75] Inventor: Tabito Doniwa, Hachioji, Japan

[73] Assignee: Daiichi Dentsu Kabushiki Kaisha, Chofu, Japan

[21] Appl. No.: 533,922

[22] Filed: Jun. 6, 1990

Related U.S. Application Data

[63] Continuation-in-part of Ser. No. 262,105, Oct. 19, 1988, abandoned, which is a continuation of Ser. No. 633,912, Mar. 31, 1987, abandoned, which is a continuation of Ser. No. 747,023, Jun. 20, 1985, abandoned.

[51] Int. Cl.$^5$ .............................................. B23D 19/06
[52] U.S. Cl. ...................................... 29/407; 29/240; 173/1
[58] Field of Search ................. 29/240, 407; 73/761, 73/862.23, 862.24; 173/1, 2

[56] References Cited

U.S. PATENT DOCUMENTS

| | | | |
|---|---|---|---|
| 3,939,920 | 2/1976 | Hardiman et al. | 73/761 |
| 4,016,938 | 4/1977 | Rice | 73/761 |
| 4,267,629 | 5/1981 | Eshghy | 73/761 |
| 4,375,121 | 3/1983 | Sigmund | 29/407 |
| 4,488,437 | 12/1984 | Pere | 73/761 |

Primary Examiner—Hien H. Phan
Attorney, Agent, or Firm—Emmanuel J. Lobato; Robert E. Burns

[57] ABSTRACT

A tension contol method for a nutrunner performed by the use of a nutrunner and a controller associated with each other. In accordance with the present invention, the fastening torque $T_f$ of the torque transducer of the nutrunner at an intermediate position of a fixed first rotation angle $\theta$ included in a middle range from the seating of a controlled screw on a tightened object to the final fastening position of the screw is stored. The motor of the nutrunner is stopped at a position of a second rotation angle $(\theta + \alpha)$ larger than the first rotation angle by a fixed value $\alpha$. The motor of the nutrunner is reversed at the second rotation angle $(\theta + \alpha)$. A return torque $T_r$ of the motor at the position of the first rotation angle $\theta$ is stored. The ratio of the fastening torque $T_f$ to a bolt tension F applied to the screw is calculated by the use of a difference between the fastening torque $T_f$ and the return torque $T_r$ at the position of the first rotation angle $\theta$. The motor is stopped at a calculated target $T_s$ obtained by multiplying a pre-input target value $F_s$ of a required bolt tension by the calculated ratio to fasten the screw at a stable required bolt force.

2 Claims, 4 Drawing Sheets

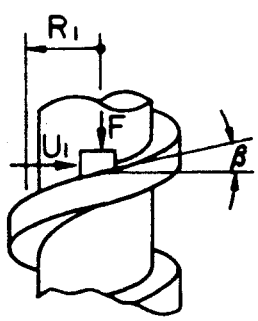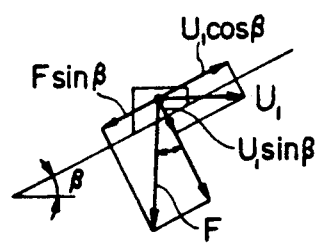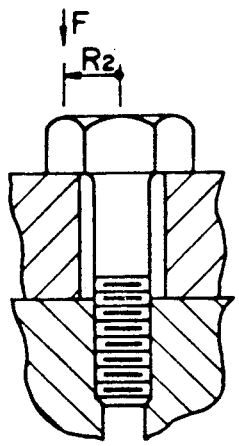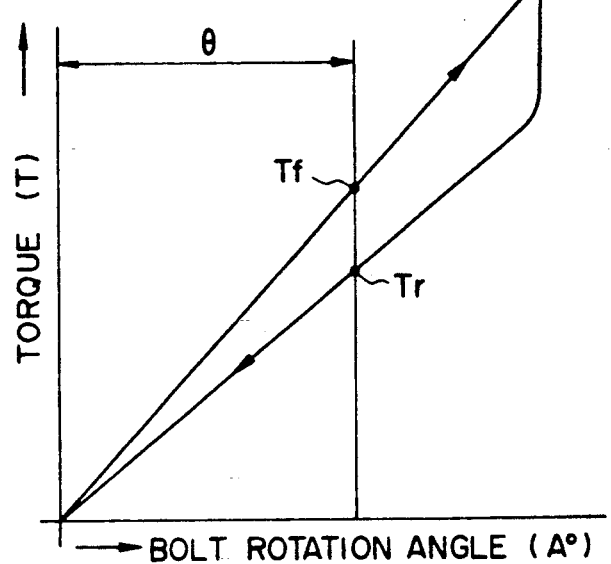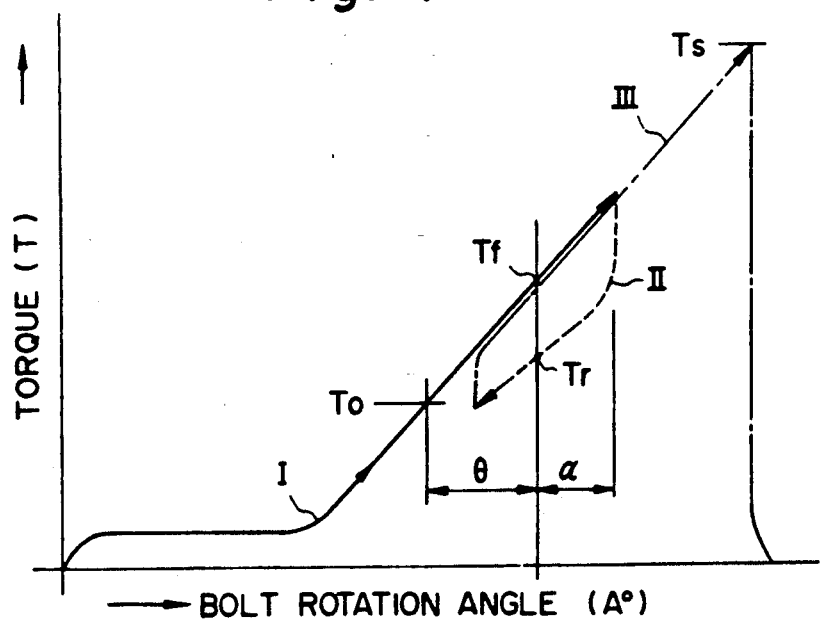

TENSION CONTROL METHOD FOR NUTRUNNER

CROSS REFERENCE TO RELATED APPLICATIONS

The present application is a continuation-in-part of an application of Ser. No. 07/262,105 filed on Oct. 19, 1988 and now abandoned being a continuation application of Ser. No. 06/633,912 filed on Mar. 31, 1987, which is a continuation application of Ser. No. 06/747,023 filed on June 20, 1985 and now abandoned.

BACKGROUND OF THE INVENTION

The present invention relates to a tension control method for a nutrunner.

Heretofore, a variety of methods such as a torque method, an angle method and a yield point method have been employed as a control method of screw fastening. It is basically important for screw-fastening to stably control the bolt tension of the fastener. In other words, it is necessary that a member to be fastened be tightened by a bolt with a fixed fastener force, i.e. a fixed bolt tension. In screw fastening, however, since there exists a frictional force between the bearing surface of the bolt head and the member to be fastened and between the fastening torque and the bolt tension of the threaded fastener, it is very difficult to stably establish a desired relationship between the bolt tension and the fastening torque. In other words, even if the screw fastening is stopped at a fixed fastening torque, a fixed bolt tension cannot be obtained. The bolt tension can be accurately detected by mounting on the bolt shank a guage which detects the elongation of the bolt. This method is enough for experimental purposes, but for mass-production use, it is almost impossible in terms of costs. In recent years there have been proposed a method which emits sound waves to the head of the threaded portion from a high-frequency sound wave generator mounted in close contact with the bolt head, measures the frequency of the reflected waves and calculates the bolt tension from elongation of the bolt after fastening, and a method which magnetically detects distortion of the bolt head at the time of fastening and calculates the bolt tension from the detected distortion. Each of these methods converts the displacement of the bolt itself to the bolt tension and calls for precise working of the distortion detecting portion of the bolt or adding to the nutrunner a complex sensor for detecting the distortion of the bolt, and hence has not been put to practical use up to now.

SUMMARY OF THE INVENTION

An object of the present invention is to provide a nutrunner tension control method which permits easy detection of the bolt tension without using such a complex sensor and ensures fastening of a screw with a predetermined bolt tension.

A tension control method of tightening threaded fasteners of the present invention is performed by the use of: a nutrunner provided with a motor, a transmission connected to the motor, an angle encoder connected to the motor, a torque transducer coupled to the transmission for detecting the output torque of the transmission and a bolt socket for receiving and holding a threaded fastener such as a bolt or screw and the like, a drive shaft connecting the bolt socket to the torque transducer; and a controller operatively connected to the nutrunner for performing arithmetic processing of present data and input data on the torque and rotation angle of a controlled threaded fastener coupled with the bolt socket and for controlling the nutrunner to start, stop and reverse the motor. In accordance with the present invention, the fastening torque $T_f$ of the torque transducer at an intermediate position of a fixed preset first rotation angle $\theta$ included in a middle range from the seating of the controlled threaded fastener on a tightened object to the final fastening position of the threaded fastener is stored. The motor of the nutrunner is stopped at a position of a second preset rotation angle $(\theta + \alpha)$ larger than the first rotation angle by a fixed value $\alpha$. The motor of the nutrunner is reversed at the second rotation angle $(\theta + \alpha)$. A return dynamic torque $T_r$ of the motor at the position of the first rotation angle $\theta$ is stored. The ratio of the detected fastening dynamic torque $T_f$ to a bolt tension $F_s$ applied to the threaded fastener is calculated by the use of a difference between the detected fastening dynamic torque $T_f$ and the detected return dynamic torque $T_r$ at the position of the first rotation angle $\theta$. The motor is stopped at a detected fastening dynamic torque $T_s$ having a value obtained by multiplying a pre-input target value or preset target tension $F_s$ of the target bolt tension by the calculated ratio to fasten the threaded fastener at a fixed bolt tension.

BRIEF DESCRIPTION OF THE DRAWINGS

The present invention will be described in detail below with reference to the accompanying drawings, in which:

FIGS. 1A and 1B are a perspective view and a vector disgram explanatory of forces applied to screwed portions;

FIG. 2 is a longitudinal section illustrating a fastened state of a screw;

FIG. 3A is a characteristic curve illustrating a trace of a torque including a fastening torque $T_f$ and return torque $T_r$;

FIG. 4 is a rotation angle to torque characteristic explanatory of the principle of the present invention;

DETAILED DESCRIPTION

Figure 3B:
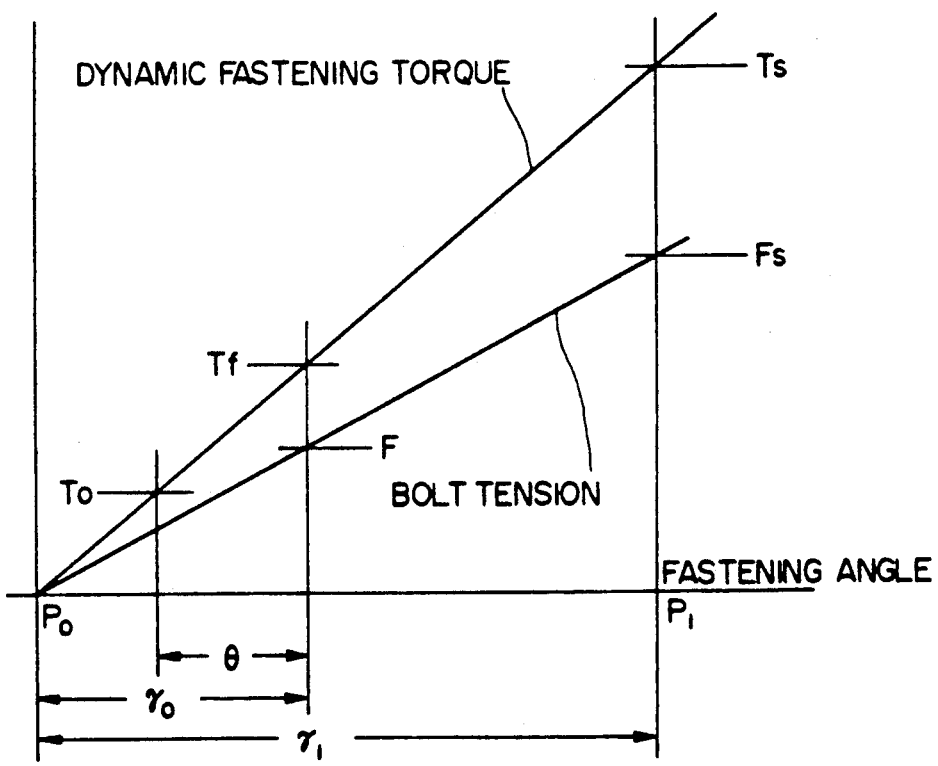
FIG. 3B shows characteristic traces of a dynamic fastening torque and a bolt tension.

The interrelationships of forces at the threaded portion are shown in FIGS. 1A and 1B. While in FIG. 1A a square thread is shown for the sake of clarity, the principles of the invention equally apply to an ordinary triangular thread as well. In FIGS. 1A and 1B, reference character F indicates a bolt tension, $U_1$ a tangential force, $\beta$ the lead angle of the screw, $R_1$ the effective radius of the thread and $\mu_1$ the coefficient of friction.

The equilibrium of forces in FIGS. 1A and 1B can be obtained from the following expression:

$$U_1\cos\beta - F\sin\beta = \mu_1(U_1\sin\beta + F\cos\beta)$$

Therefore, $$U_1 = F \frac{\mu_1 \cos\beta + \sin\beta}{\cos\beta - \mu_1 \sin\beta}$$

$$= F \frac{\mu_1 + \tan\beta}{1 - \mu_1 \tan\beta} \qquad (1)$$

In screw fastening, since the coefficient of friction $\mu_1$ is generally in the range of 0.2 to 0.5 and the value of $\tan\beta$ in the range of 0.06 to 0.03, the value of the denominator, $\mu_1 \tan\beta$, in expression (1) is small and infinitesimal. Omitting this, the following expression (2) is obtained.

$$U_l = F(\mu_1 + \tan\beta) \qquad (2)$$

The above expression is obtained at the time of fastening and, in the case of reversal, the following expression (3) is obtained:

$$U_2 = F(\mu_1 - \tan\beta) \qquad (3)$$

The tangential forces ($U_1$, $U_2$ ...) and the torques ($T_1$, $T_2$ ...) bear the following relation:

$$U_1 \cdot R_1 = T_1$$

Therefore, $$U_1 = T_1/R_1 \qquad (4)$$

$$U_2 \cdot R_2 = T_2$$

Therefore, $$U_1 = T_2/R_1 \qquad (5)$$

Substitution of expressions (4) and (5) into expressions (2) and (3) gives:

$$T_1 = F \cdot R_1(\mu_l + \tan\beta) \qquad (6)$$

$$T_2 = F \cdot R_1(\mu_1 - \tan\beta) \qquad (7)$$

The frictional resistivity of the screw is effected between the bearing surface of the bolt head and the member to be fastened as well as between the screw and the latter in connection with the fastened state of a bolt as shown in FIG. 2.

Letting the frictional resistance torque of the bolt head, the effective radius of the thread, the bolt tension and the coefficient of friction be represented by $T_3$, $R_2$, $F$ and $\mu_2$, respectively, they bear the following relation:

$$T_3 = F \cdot R_2 \cdot \mu_2 \qquad (8)$$

This friction torque remains unchanged at the time of fastening and at the time of reversal. The total torque $T_f$ at the time of fastening can be represented by a condition: $T_f = T_1 + T_3$ and it follows that $$T_f = F \cdot R_1(\mu_1 + \tan\beta) + F \cdot R_2 \cdot \mu_2 \qquad (9)$$

The total torque $T_r$ can be represented by a condition: $T_r = T_2 + T_3$ and it follows:

$$T_r = F \cdot R_1(\mu_1 - \tan\beta) + F \cdot R_2 \cdot \mu_2 \qquad (10)$$

FIG. 3 shows the loci of the fastening torque and the returning torque relative to the bolt rotation angle. Let the fastening torque and the return or reverse torque at the position spaced an angular distance $\theta$ be represented by $T_f$ and $T_r$. Since they are on the same angle, the bolt tension is identical both at the time of fastening and reversal. A difference dT between the fastening dynamic torque $T_f$ and the reverse or return dynamic torque $T_r$ at the angle $\theta$ is as follows:

$$T_f - T_r = F \cdot R_1(\mu_1 + \tan\beta) + F \cdot R_2 \cdot \mu_2 - F \cdot R_1(\mu_1 - \tan\beta) - F \cdot R_2 \cdot \mu_2$$

Therefore, $$T_f - T_r = 2F \cdot R_1 \cdot \tan\beta \qquad (11)$$

Letting the pitch of the threads be represented by P, $$\tan\beta = P/2\pi R_1 \qquad (12)$$

Substitution of expression (12) into expression (11) gives:

$$T_f - T_r = F \cdot P/\pi$$

Therefore, $$F = \pi(T_f - T_r)/P \qquad (13)$$

Thus, the coefficient of friction is cancelled in expression (13) and the bolt tension F can be expressed as a function of the difference value between the fastening dynamic torque $T_f$ and the return torque $T_r$ and the pitch P of thread. As shown in FIG. 3B, letting the target bolt tension and its equivalently dynamic torque be represented by $F_s$ and $T_s$, respectively, letting also the fastening angle between the starting position $P_0$ and the position of the angle $\theta$, and the total angle between the starting angle $P_0$ and the final fastening position $P_1$ be presented by $\gamma_0$ and $\gamma_1$ respectively. These relation are as follows:

$$T_s/T_f = \gamma_1/\gamma_0;\ F_s/F = \gamma_1/\gamma_0$$

Therefore, $$T_s/T_f = F_s/F;\ T_s = F_s T_f/F \qquad (14)$$

Substitution of expression (13) into expression (14) gives:

Therefore, $$T_s = F_s T_f P/\pi(T_f - T_r) \qquad (15)$$

Accordingly, once the target bolt tension $F_s$ is determined, its equivalently dynamic target torque $T_s$ can easily be calculated immediately after the measuring of the fastening dynamic torque $T_f$ and the return dynamic torque $T_r$, and fastening of the screw with the calculated dynamic target torque $T_s$ corresponds to fastening with the target bolt tension $F_s$.

Figure 5:
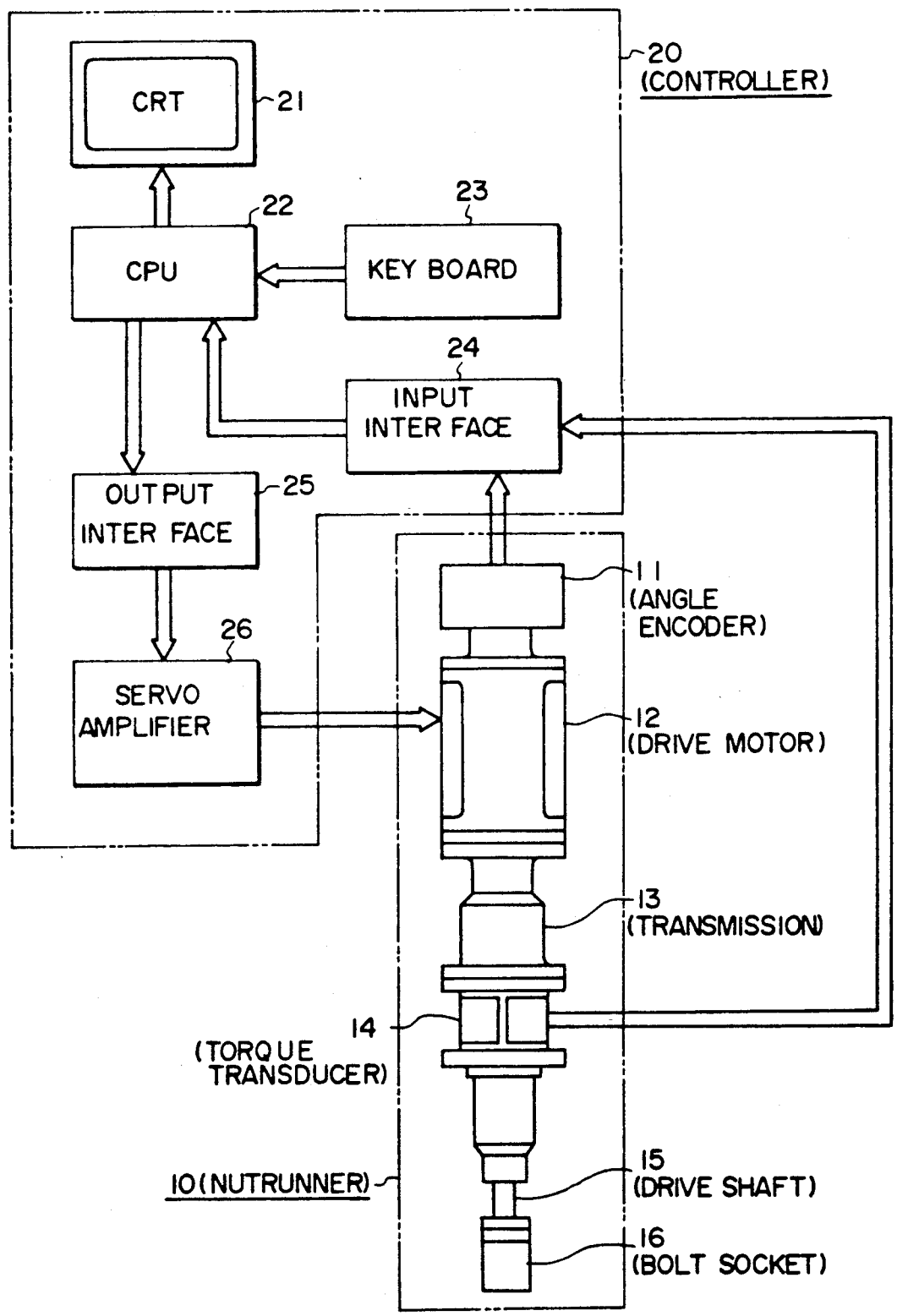
FIG. 5 is a block diagram illustrating an embodiment of the present invention.

A description will be given of an embodiment of the present invention. FIG. 5 is a block diagram illustrating the hardware arrangement of this invention system, comprising a nutrunner 10 and a controller 20. The nutrunner 10 comprises an angle encoder 11 for detecting an angle, a driving motor 12, a transmission 13, a torque transducer 14 for detecting a torque, a driving shaft 15 and a bolt socket 16. The controller 20 comprises a data display CRT 21, a CPU 22 for performing sequence and calculation control, a keyboard 23 for establishing data into the CPU 22, an input interface 24, an output interface 25 and a servo amplifier 26 for driving the motor 12. Although in FIG. 5 the CPU is employed for performing the sequence and calculation control by software, it is also possible to use a hard logic circuitry instead of the CPU.

Figure 6:
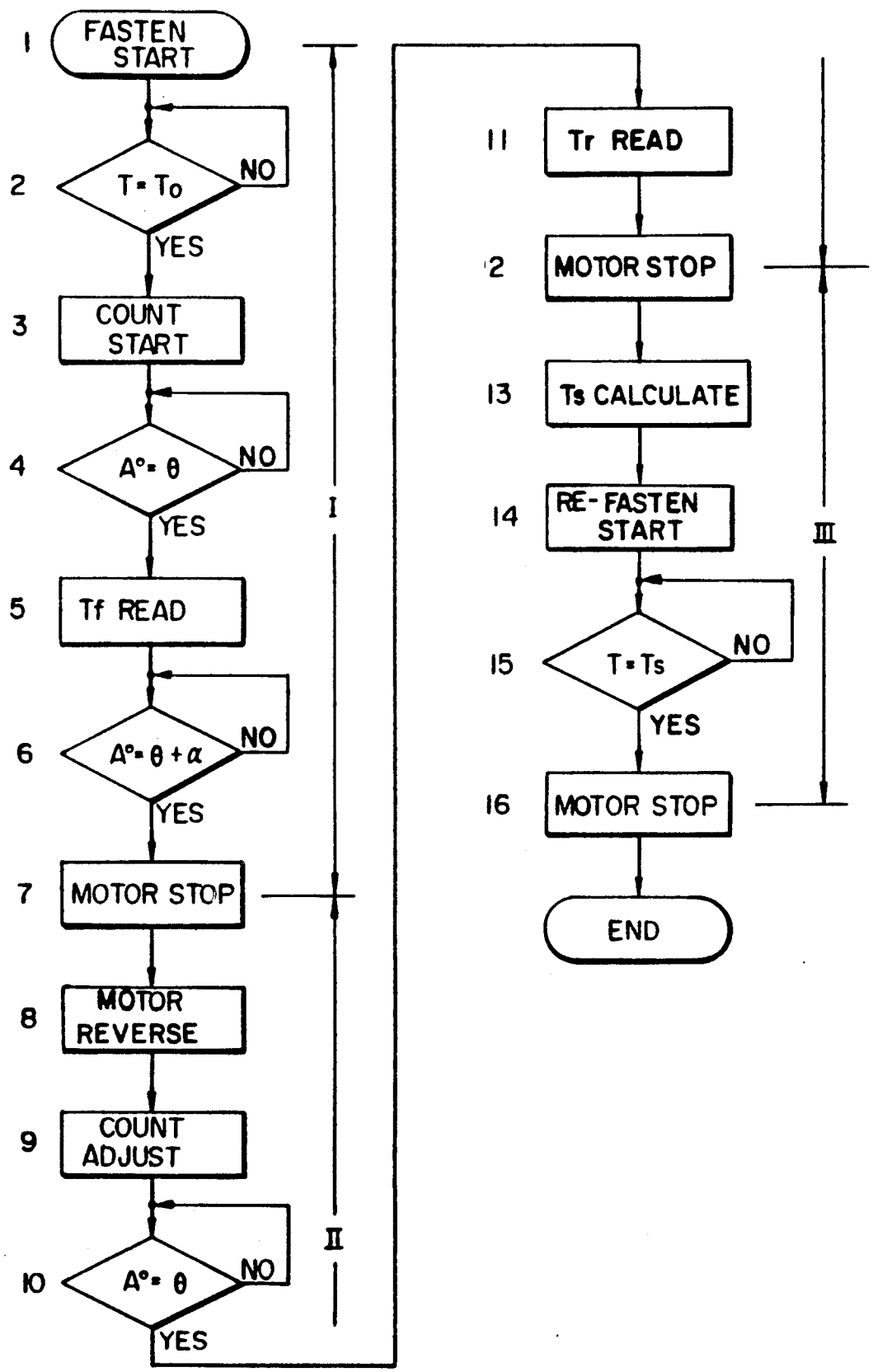
FIG. 6 is a flow chart explanatory of the operations of the embodiment shown in FIG. 5.

FIG. 4 shows a characteristic curve of torque relative to the bolt rotation angle, and FIG. 6 a flowchart of a program. The fastening torque will be described following the flow of operation shown in FIG. 6. In FIG. 6, reference character T indicates the absolute value of the torque and A° the actual value of angle. In step #1 the motor 12 is started to begin the fastening operation, and in step #2 a test is made by the output of the torque transducer 14 to determined if the torque T has reached a value $T_0$ shown on the characteristic curve shown in FIG. 4. If so, the counting of angle pulses of the angle encoder 11 is started in step #3, and it is tested in step #4 whether the rotational angle of the bolt is equal to a predetermined preset first rotation angle $\theta$. If so, the fastening torque $T_f$ of the torque transducer 14 at that angular position is stored in step #5. Then it is tested in step #6 whether the rotation angle of the bolt is equal to a predetermined preset second rotation angle $\theta+\alpha$, and if so, then the motor 12 is stopped in step #7. The values of $\theta$ and $\alpha$ can be appropriately determined at a range from the rising point to the last torque $T_s$ of a linear slope in the characteristic curve shown in FIG. 4. The value $T_o$ and the fastening torque $T_f$ are determined at the starting region and the middle region in the linear slope as shown in FIG. 4. In step #8 the rotation direction of the motor 12 is reversed and in step #9 substractive rotation pulses are inhibited until a certain reverse torque is detected so as to correct backlash of the bolt socket 16 and the bolt head and backlash of the transmission 13. In step #10 it is decided whether the rotation angle has been reduced to $\theta$, and if so, the return torque $T_r$ (absolute value) is stored in step #11 and the motor 12 is stopped in step #12. In step #13 the target torque $T_s = F_s \cdot T_f \cdot P / \pi (T_f - T_r)$ is calculated from the value P of the pitch of the thread and the target bolt tension $F_s$ which are preset by the keyboard 23 before the start of the operation. In step #14 the motor 12 is again started for refastening and in step #15 a test is made to determine if the torque is equal to $T_s$. If so, the motor 12 is stopped in step #16. The above are the operation sequence of the tension control.

Step ranges I, II, III are, respectively, correspond to operation ranges I, II, III shown in FIG. 4. As understood from these ranges I, II, III, the screw fastening by the present invention are carried out in the three operation ranges after seating of a screw.

The present invention employs, as hardware, an ordinary nutrunner operating in detecting torques and angles, as shown in FIG. 5, and the controller used is not a complex one. The present invention is a useful invention which easily implements tension control through utilization of rules of dynamics.

What I claim is:

1. In a tension control method of tightening threaded fasteners by the use of:

a nutrunner provided with a motor, a transmission connected to the motor, an angle encoder connected to the motor, a torque transducer coupled to the transmission for detecting the output torque of the transmission, a bolt socket for receiving and holding a threaded fastener such as a bolt or screw, and a drive shaft for connecting the bolt socket to the torque transducer; and a controller operatively connected to the nutrunner for performing arithmetic processing of preset data and input data on the torque and rotation angle of a controlled threaded fastener coupled to the bolt socket and for controlling the nutrunner to start, stop and reverse rotation of the motor;

the method comprising the steps of:

starting rotation of said motor for fastening the threaded fastener, storing the detected fastening dynamic torque $T_f$ of the torque transducer at a detected intermediate position of a predetermined fixed preset first rotation angle $\Theta$ included in a middle range of positions from the seating position of the controlled threaded fastener on a tightened object to a final fastening position of the threaded fastener;

stopping temporarily the rotation of the motor at a detected position of a preset second rotation angle $(\Theta+\alpha)$ larger than the first rotation angle $\Theta$ by a fixed value;

reversing the rotation of the motor at the detected position of the present second rotation angle $(\Theta+\alpha)$ storing a detected return dynamic torque $T_r$ of the motor at the position of the preset first rotation angle $\Theta$;

calculating the fastening dynamic target torque $T_s$ from the detected fastening dynamic torque $T_f$, the detected return dynamic torque $T_r$, a preset value P of the screw pitch of the threaded fastener and a preset target bolt tension $F_s$;

reversing the motor to tighten the fastener; and stopping the motor at the calculated fastening dynamic torque $T_s$ thereby to complete tightening the threaded fastener at the preset target bolt tension $F_s$.

2. A tension control method for a nutrunner according to claim 1, characterized in that said predetermined function for fastening dynamic target torque $T_s$ is defined by an equation:

$$T_s = F_s \cdot T_f \cdot P / \pi (T_f - T_r) = F_s \cdot T_f / F$$

where $F_s$ is the present target bolt tension, $T_f$ is the detected fastening dynamic torque, $T_r$ is the detected return dynamic torque, P is the preset value of the screw pitch of the threaded fastener, $\pi$ is the circular constant, and F is a bolt tension of the threaded fastener.

* * * * *